United States Patent
Ito

(10) Patent No.: US 7,946,956 B2
(45) Date of Patent: May 24, 2011

(54) BRAKING/DRIVING FORCE CONTROL DEVICE

(75) Inventor: Yoshio Ito, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 127 days.

(21) Appl. No.: 12/446,242

(22) PCT Filed: Oct. 3, 2007

(86) PCT No.: PCT/JP2007/069391
§ 371 (c)(1),
(2), (4) Date: Apr. 20, 2009

(87) PCT Pub. No.: WO2008/047602
PCT Pub. Date: Apr. 24, 2008

(65) Prior Publication Data
US 2010/0029442 A1   Feb. 4, 2010

(30) Foreign Application Priority Data
Oct. 18, 2006   (JP) .................................. 2006-284275

(51) Int. Cl.
*B60W 10/06* (2006.01)
(52) U.S. Cl. ........................................ 477/107; 477/110
(58) Field of Classification Search .................. 477/107, 477/110, 111, 115
See application file for complete search history.

(56) References Cited

U.S. PATENT DOCUMENTS

| 6,315,068 | B1 * | 11/2001 | Hoshiya et al. | ............ 180/65.25 |
| 7,383,115 | B2 * | 6/2008 | Tabata et al. | .................... 701/96 |
| 7,426,972 | B2 * | 9/2008 | Tabata et al. | ............... 180/65.22 |
| 7,502,679 | B2 * | 3/2009 | Tabata et al. | .................... 701/70 |
| 7,566,288 | B2 * | 7/2009 | Tabata et al. | ..................... 477/4 |

FOREIGN PATENT DOCUMENTS

| EP | 0 831 255 81 | 3/1998 |
| JP | 10-2412 | 1/1998 |
| JP | 2000-145937 | 5/2000 |
| JP | 2002-337573 | 11/2002 |
| JP | 2005-048814 | 2/2005 |
| JP | 2006-020481 | 1/2006 |

* cited by examiner

Primary Examiner — Ha D. Ho
(74) Attorney, Agent, or Firm — Oblon, Spivak, McClelland, Maier & Neustadt, L.L.P.

(57) ABSTRACT

A braking/driving force control device for changing output torque by controlling torque or a rotation number of a power source includes a unit for setting a plurality of ranges by a plurality of parameters including an output rotation number, a range judging unit that judges that a range corresponds to any of the plurality of ranges based on the parameter while driving, and a control unit that controls the torque or the rotation number of the power source based on a driving environment and a range judgment result by the range judging unit. This enables driving regulation control by, for example, a driving environment other than intentional shifting operation by a driver, in a vehicle of a type without a transmission.

9 Claims, 13 Drawing Sheets

FIG.8

| GEAR POSITION | GEAR RATIO RANGE |
|---|---|
| FIRST SPEED | 3.3 |
| SECOND SPEED | 1.35 TO 1.96 |
| THIRD SPEED | 1.0 TO 1.35 |
| FOURTH SPEED | 0.73 TO 1.0 |
| FIFTH SPEED | 0.58 TO 0.73 |
| SIXTH SPEED | 0.58 |

FIG.11

| ROAD GRADIENT $\theta$ | MEDIUM UPSLOPE | $5^{th}$ |
| --- | --- | --- |
| | GENTLE UPSLOPE | $6^{th}$ |
| | FLAT | $6^{th}$ |
| | GENTLE DOWNSLOPE | $6^{th}$ |
| | MEDIUM DOWNSLOPE | $5^{th}$ |

FIG.13

|  |  | INTER-VEHICLE TIME PERIOD | | | |
|---|---|---|---|---|---|
|  |  | 0 TO 1.0 | 1.0 TO 2.0 | 2.0 TO 3.0 | 3.0 TO |
| RELATIVE VEHICLE SPEED | 0 TO -10 | 6th | 6th | 6th | 6th |
| | -10 TO -20 | 4th | 5th | 5th | 6th |
| | -20 TO -30 | 3rd | 4th | 4th | 6th |
| | -30 TO -40 | 3rd | 3rd | 4th | 6th |
| | -40 TO | 3rd | 3rd | 3rd | 5th |

BRAKING/DRIVING FORCE CONTROL DEVICE

TECHNICAL FIELD

The present invention relates to a braking/driving force control device, and especially relates to the braking/driving force control device for changing output torque by controlling torque or a rotation number of a power source (including an engine or a motor generator).

BACKGROUND ART

A braking/driving force control device for changing the output torque by controlling the torque or the rotation number of the power source (including the engine or the motor generator) is known.

For example, Japanese Patent Application Laid-Open No. 2006-20481 (Patent Document 1) discloses the following power output device. In a hybrid vehicle in which an engine, a first motor, and a drive shaft are connected to a carrier, a sun gear, and a ring gear of a planetary gear mechanism, respectively, and a second motor is connected to the drive shaft, at the time of shifting operation to a brake range, a lower limit rotation number of the engine is set based on a vehicle speed, and an operation point (target rotation number) of the engine to output engine required power based on required torque corresponding to accelerator opening is set, and it is controlled such that the engine is operated at the lower limit rotation number and the required torque is output to the drive shaft, when the target rotation number is smaller than the lower limit rotation number. Thereby, it is possible to inhibit the engine from being operated at the rotation number different from the rotation number intended by the driver by the accelerator opening, so that excellent driving felling can be obtained.

Patent Document 1: Japanese Patent Application Laid-Open No. 2006-20481
Patent Document 2: Japanese Patent Application Laid-Open No. 2005-48814
Patent Document 3: Japanese Patent Application Laid-Open No. 2000-145937

DISCLOSURE OF INVENTION

Problem to be Solved by the Invention

Patent Document 1 discloses a technique of a hybrid vehicle to set the lower limit rotation number of the engine based on the vehicle speed when a sequential shift is operated and the required torque of the engine is set so as not to be smaller than the lower limit rotation number.

In the technique in Patent Document 1, by shifting operation by a driver (such as indication of fifth speed and fourth speed by the sequential shifting operation), the lower limit rotation number corresponding to the indication is merely set. Therefore, it is not considered to perform control other than intentional shifting operation by the driver such as driving regulation due to a driving environment (such as road gradient, degree of curve at a corner in front of the vehicle, relative positional relationship between a vehicle ahead). In this manner, in the technique of Patent Document 1, driving regulation control by the driving environment other than the intentional shifting operation by the driver cannot be performed.

For example, in the vehicle of a type without a transmission such as the Toyota Hybrid System (THS), for example, it is desired that the driving regulation control by the driving environment other than the intentional shifting operation by the driver be performed. Further, in this case, it is desired that reacceleration response of the vehicle is excellent.

An object of the present invention is to provide the braking/driving force control device enabling, for example, the driving regulation control by the driving environment other than the intentional shift operation by the driver in the vehicle of the type without the transmission.

Another object of the present invention is to provide the braking/driving force control device enabling, for example, the driving regulation control by the driving environment other than the intentional shifting operation by the driver and with the excellent reacceleration response of the vehicle in the vehicle having a hybrid system of the type without a transmission.

Means for Solving Problem

A braking/driving force control device according to the present invention is the braking/driving force control device for controlling braking/driving force of a hybrid vehicle by changing an output torque by controlling torque of an internal-combustion engine, a rotation number of the internal-combustion engine, torque of an electric motor, and a rotation number of the electric motor, and includes a setting unit that sets a plurality of shift ranges by a plurality of parameters including an output rotation number, a range judging unit that judges that a shift range corresponds to any of the plurality of shift ranges based on the parameters during driving, and a controlling unit that controls torque of the internal-combustion engine, the rotation number of the internal-combustion engine, torque of the electric motor, and a rotation number of the electric motor based on a driving environment and a range judgment result by the range judging unit.

In the braking/driving force control device according to the present invention, it is preferable that the controlling unit performs the control based on a preset driving force, and changes the preset driving force based on the shift range determined based on the driving environment, when the judged shift range is a shift range determined based on the driving environment or a shift range higher than the shift range determined based on the driving environment.

In the braking/driving force control device according to the present invention, it is preferable that a lower limit guard of a rotation number of the internal-combustion engine is set for each of the shift ranges, and the controlling unit performs the control based on a preset rotation number of the internal-combustion engine, and changes the preset rotation number of the internal-combustion engine to a rotation number of the internal-combustion engine not smaller than the lower limit guard based on the shift range determined based on the driving environment, when the judged shift range is a shift range determined based on the driving environment or a shift range higher than the shift range determined based on the driving environment.

In the braking/driving force control device according to the present invention, it is preferable that the plurality of shift ranges are set based on an output rotation number and an input rotation number.

In the braking/driving force control device according to the present invention, it is preferable that the plurality of shift ranges are set based on an output rotation number and an output torque.

Effect of the Invention

The braking/driving force control device according to the present invention provides an effect that the driving regulation control by the driving environment other than the intentional shifting operation by the driver is performed, for example, in the vehicle of the type without a transmission.

BRIEF DESCRIPTION OF DRAWINGS

FIG. 8 is another map for calculating the driver required gear position in the first embodiment of the braking/driving force control device of the present invention.

FIG. 11 is a map showing relationship between a road gradient and a target gear position of the first embodiment of the braking/driving force control device of the present invention.

FIG. 13 is a map showing a gear position according to relative positional relationship with a vehicle ahead in the first embodiment of the braking/driving force control device of the present invention.

EXPLANATIONS OF LETTERS OR NUMERALS

Figure 1:
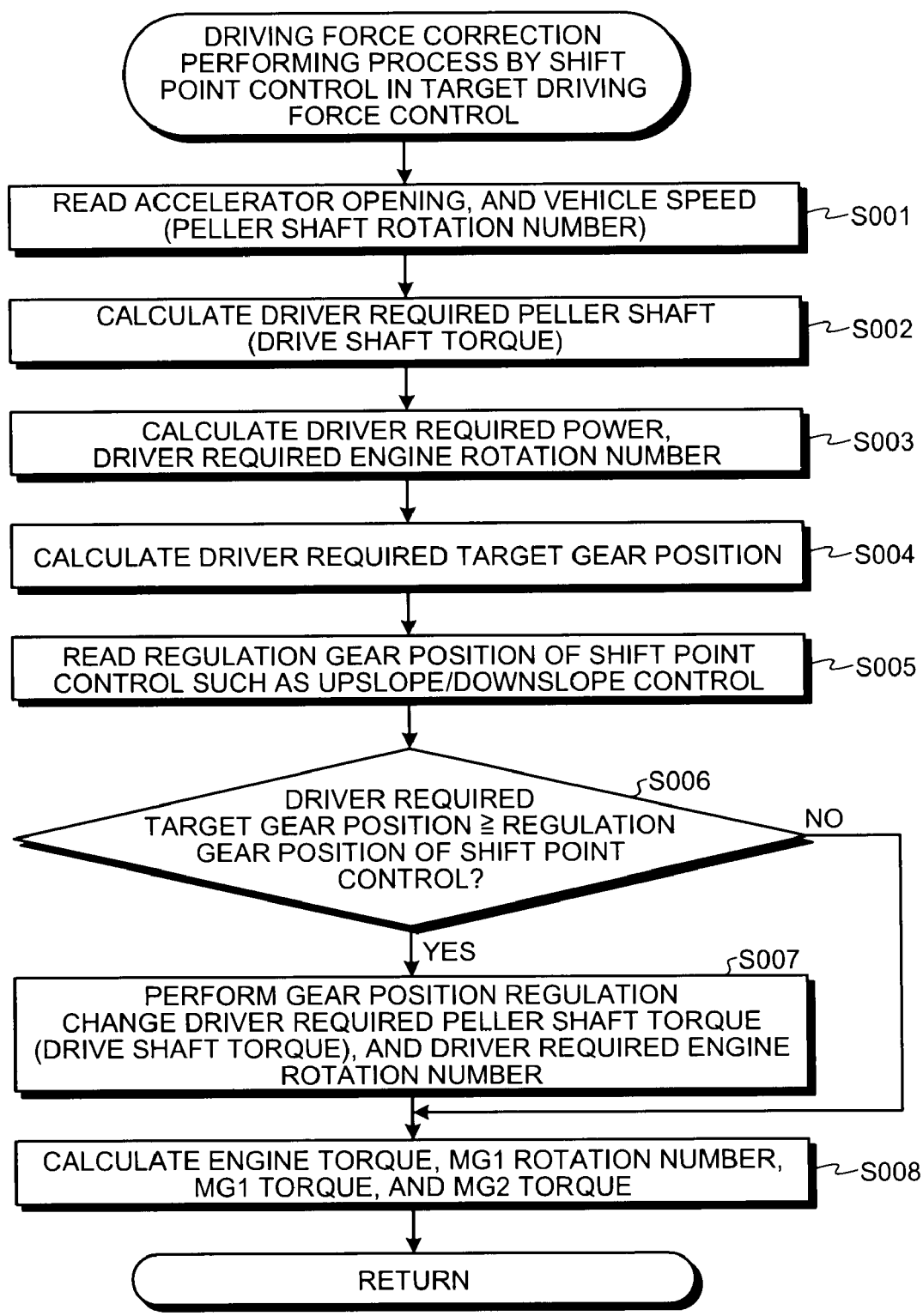
FIG. 1 is a flowchart showing operation of a first embodiment of a braking/driving force control device of the present invention.

20 HYBRID VEHICLE
22 ENGINE
24 ENGINE ECU
26 CRANK SHAFT
28 DAMPER
30 POWER DISTRIBUTION MECHANISM
31 SUN GEAR
32 RING GEAR
32A RING GEAR SHAFT
33 PINION GEAR
34 CARRIER
35 REDUCTION GEAR
40 MOTOR ECU
41 INVERTER
42 INVERTER
43 ROTATIONAL POSITION DETECTION SENSOR
44 ROTATIONAL POSITION DETECTION SENSOR
50 BATTERY
51 TEMPERATURE SENSOR
52 BATTERY ECU
54 ELECTRICITY LINE
60 GEAR MECHANISM
62 DIFFERENTIAL GEAR
63a DRIVING WHEEL
63b DRIVING WHEEL
70 HYBRID ELECTRONIC CONTROL UNIT
72 CPU
74 ROM
76 RAM
80 IGNITION SWITCH
81 SHIFT LEVER
82 SHIFT POSITION SENSOR
83 ACCELERATION PEDAL
84 ACCELERATION PEDAL POSITION SENSOR
85 BRAKE PEDAL
88 VEHICLE SPEED SENSOR
401 FIRST SPEED RANGE
402 SECOND SPEED RANGE
403 THIRD SPEED RANGE
404 FOURTH SPEED RANGE
405 FIFTH SPEED RANGE
406 SIXTH SPEED RANGE
420 LOWER LIMIT ENGINE ROTATION NUMBER (ENGINE ROTATION NUMBER GUARD)
421 POINT IN D RANGE
422 POINT IN FOURTH SPEED
423 GUARDED POINT
$A_{CC}$ ACCELERATOR OPENING
BP BRAKE PEDAL POSITION
MG1 MOTOR GENERATOR
MG2 MOTOR GENERATOR
PAP ACCELERATOR OPENING
SP SHIFT POSITION
V VEHICLE SPEED

BEST MODE(S) FOR CARRYING OUT THE INVENTION

Hereinafter, one embodiment of the present invention is described in detail with reference to the drawings.

First Embodiment

A first embodiment of a braking/driving force control device of the present invention is described with reference to FIGS. 1 to 13.

This embodiment performs the following operations (1) and (2) in a hybrid system control device (a power train control device under driving force demand) for determining an engine rotation number, engine torque, an MG1 rotation number, MG1 torque, MG2 torque, and the like in order to realize driver required peller shaft torque (driver shaft torque) or driving force determined by accelerator opening and a vehicle speed (peller shaft rotation number).

(1) A driver required target gear position (target gear ratio) is determined by a target engine rotation number determined by the driver required peller shaft torque and the vehicle speed (peller shaft rotation number). Alternatively, the target gear position is determined by the accelerator opening, the vehicle speed (peller shaft rotation number), and the driver required peller shaft torque. Alternatively, the gear ratio is calculated by the driver required engine rotation number and the peller shaft rotation number to determine the target gear position. A gear position regulation (gear ratio regulation) of driving regulation control (shift point control) by a driving environment other than intentional shifting operation by the driver, such as upslope/downslope control, corner control, and inter-vehicle distance control is reflected on the target gear position (target gear ratio).

(2) The peller shaft torque (drive shaft torque) or the driving force and an engine rotation number lower limit guard are set for each target gear position (target gear ratio), and when the gear position regulation (gear ratio regulation) of the driving regulation control due to the driving environment is reflected, target peller shaft torque and the target engine rotation number are changed to calculate target engine torque, a target MG1 rotation number, a target MG1 torque, and target MG2 torque.

Figure 9:
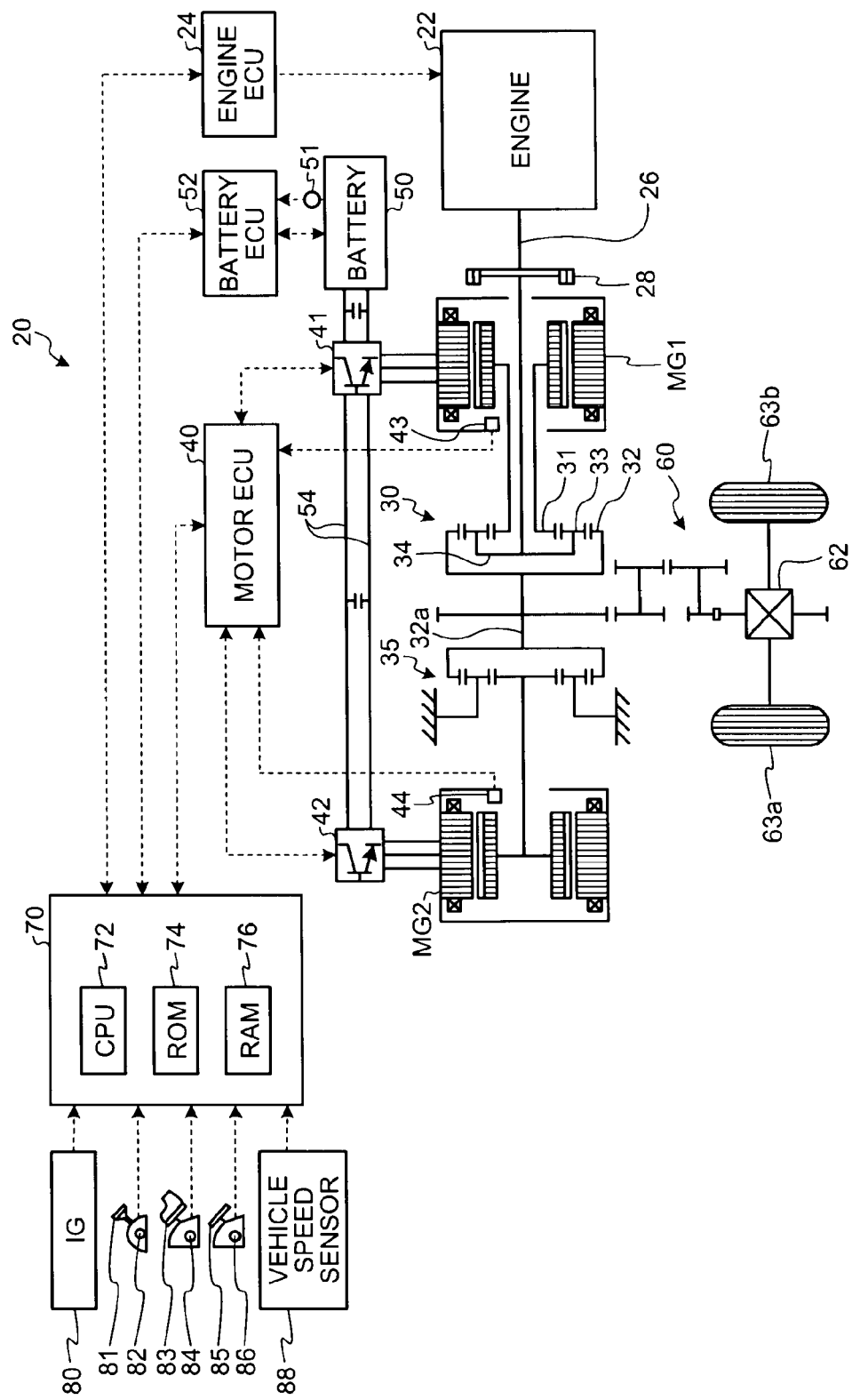
FIG. 9 is a block diagram showing a schematic configuration of the first embodiment of the braking/driving force control device of the present invention.

FIG. 9 is a configuration diagram showing an overview of a configuration of a hybrid vehicle 20 equipped with a braking/driving force control device as one embodiment of the present invention. The hybrid vehicle 20 according to this embodiment is provided with an engine 22, a triaxial power distribution integration mechanism 30 connected to a crank shaft 26 as an output shaft of the engine 22 through a damper 28, a motor MG1 capable of generating electricity connected to the power distribution integration mechanism 30, a reduction gear 35 attached to a ring gear shaft 32a as a drive shaft connected to the power distribution integration mechanism 30, a motor MG2 connected to the reduction gear 35, and a hybrid electronic control unit 70 for controlling an entire braking/driving force control device, as shown.

The engine 22 is an internal-combustion engine for outputting power by hydrocarbon fuel such as gasoline and light oil, and receives operation control such as fuel injection control, ignition control, and intake air mass adjustment control by an engine electronic control unit (hereinafter, referred to as an engine ECU) 24 for inputting signals from various sensors for detecting an operating condition of the engine 22. The engine ECU 24, which is in communication with the hybrid electronic control unit 70, controls the operation of the engine 22 according to a control signal from the hybrid electronic control unit 70 and outputs data relating to the operating condition of the engine 22 to the hybrid electronic control unit 70 as needed.

The power distribution integration mechanism 30 is provided with a sun gear 31, which is an external-tooth gear, a ring gear 32, which is an internal-tooth gear arranged concentrically with the sun gear 31, a plurality of pinion gears 33 meshing with the sun gear 31 and with the ring gear 32, and a carrier 34 for rotatably and revolvably holding the pinion gears 33, and is configured as a planetary gear mechanism for performing a differential action with the sun gear 31, the ring gear 32, and the carrier 34 as rotational elements.

In the power distribution integration mechanism 30, the crank shaft 26 of the engine 22 is coupled to the carrier 34, the motor MG1 is coupled to the sun gear 31, and the reduction gear 35 is coupled to the ring gear 32 through the ring gear shaft 32a, respectively, and when the motor MG1 serves as an electricity generator, the power from the engine 22 input from the carrier 34 is distributed to the sun gear 31 side and the ring gear 32 side according to the gear ratio thereof, and when the motor MG1 serves as an electric motor, the power from the engine 22 input from the carrier 34 and the power from the motor MG1 input from the sun gear 31 are integrated and output to the ring gear 32 side. The power output to the ring gear 32 is finally output to driving wheels 63a and 63b of the vehicle from the ring gear shaft 32a through a gear mechanism 60 and a differential gear 62.

Each of the motors MG1 and MG2 is configured as a well-known synchronous generator-motor capable of being driven as the electricity generator and being driven as the electric motor, and exchanges electricity with a battery 50 through inverters 41 and 42. Electricity lines 54 connecting the inverters 41 and 42 and the battery 50 are configured as a positive electrode bus bar and a negative electrode bus bar commonly used by the inverters 41 and 42, and the electricity generated by one of the motors MG1 and MG2 can be consumed by the other motor. Therefore, the battery 50 is charged and discharged by electricity generated by one of the motors MG1 and MG2 and by insufficient electricity. Meanwhile, if the electricity from the motors MG1 and MG2 is balanced, the battery 50 is not charged and discharged.

A motor electronic control unit (hereinafter, referred to as a motor ECU) 40 controls the drive of the motors MG1 and MG2. Signals required for controlling the drive of the motors MG1 and MG2, such as signals from rotational position detection sensors 43 and 44 for detecting rotational positions of rotators of the motors MG1 and MG2 and phase current to be applied to the motors MG1 and MG2 detected by a current sensor not shown are input to the motor ECU 40, and switching control signals to the inverters 41 and 42 are output from the motor ECU 40. The motor ECU 40, which is in communication with the hybrid electronic control unit 70, controls the drive of the motors MG1 and MG2 by the control signal from the hybrid electronic control unit 70 and outputs data relating to the operating condition of the motors MG1 and MG2 to the hybrid electronic control unit 70 as needed.

The battery 50 is managed by a battery electronic control unit (hereinafter, referred to as a battery ECU) 52. Signals required for managing the battery 50, such as inter-terminal voltage from a voltage sensor (not shown) installed between terminals of the battery 50, charging/discharging current from a current sensor not shown attached to the electricity line 54 connected to an output terminal of the battery 50, a cell temperature Tb from a temperature sensor 51 attached to the battery 50 are input to the battery ECU 52, and data relating to a condition of the battery 50 is output to the hybrid electronic control unit 70 by communication as needed. Meanwhile, the battery ECU 52 also calculates a state of charge (SOC) based on an integrated value of the charging/discharging current detected by the current sensor in order to manage the battery 50.

The hybrid electronic control unit 70 is configured as a microprocessor centered on a CPU 72, and is provided with a ROM 74 for storing a processing program, a RAM 76 for temporarily storing data, and an input port, an output port, and a communication port (not shown), in addition to the CPU 72. An ignition signal from an ignition switch 80, a shift position SP from a shift position sensor 82 for detecting an operation position of a shift lever 81, accelerator opening Acc from an accelerator pedal position sensor 84 for detecting a depression amount of an acceleration pedal 83, a brake pedal position BP from a brake pedal position sensor 86 for detecting a depression amount of a brake pedal 85, and a vehicle speed V from a vehicle speed sensor 88 are input to the hybrid electronic control unit 70 through the input port. The hybrid electronic control unit 70 is connected to the engine ECU 24, the motor ECU 40, and the battery ECU 52 through the communication port, as described above, to exchange various control signals and data with the engine ECU 24, the motor ECU 40, and the battery ECU 52.

The hybrid vehicle 20 of the first embodiment thus configured calculates required torque, which should be output to the ring gear shaft 32a as the drive shaft, based on the accelerator opening Acc corresponding to the depression amount of the accelerator pedal 83 by the driver and the vehicle speed V (step S002 in FIG. 1 to be described later), and the operations of the engine 22 and the motors MG1 and MG2 are controlled such that required power (step S003) corresponding to the required torque is output to the ring gear shaft 32*a*.

As the operation control of the engine 22 and the motors MG1 and MG2, there are a torque conversion operation mode, a charging/discharging operation mode, a motor operation mode, and the like.

The torque conversion operation mode is the operation mode to control the operation of the engine 22 such that the power matching the required power is output from the engine 22 and to control the drive of the motors MG1 and MG2 such that entire power output from the engine 22 is torque-converted by the power distribution integration mechanism 30 and the motors MG1 and MG2 to be output to the ring gear shaft 32*a*.

The charging/discharging operation mode is the operation mode to control the operation of the engine 22 such that the power matching a sum of the required power and the electricity required for charging and discharging the battery 50 is output from the engine 22, and to control the drive of the motors MG1 and MG2 such that an entire or a part of the power output from the engine 22 with the charging and discharging of the battery 50 is torque-converted by the power distribution integration mechanism 30 and the motors MG1 and MG2 and the required power is output to the ring gear shaft 32*a*.

The motor operation mode is the operation mode to control the operation such that the operation of the engine 22 is stopped and the power matching the required power from the motor MG2 is output to the ring gear shaft 32*a*.

In this embodiment, when the shift lever 81 is operated to a D (drive) range and to a R (reverse) range, the engine 22 and the motors MG1 and MG2 are operated in any of the above-described torque conversion operation mode, the charging/discharging operation mode, and the motor operation mode based on efficiency of the engine 22 and condition of the battery 50, and when the shift lever 81 is operated to a B (brake) range, the operation in the motor operation mode is prohibited such that braking by the engine brake is performed, and the engine 22 and the motors MG1 and MG2 are operated in any of the torque conversion operation mode and the charging/discharging operation mode other than the motor operation mode.

That is to say, although the operation of the engine 22 is stopped in the D range and the R range, the operation of the engine 22 is not stopped in the B range. Meanwhile, when the shift lever 81 is operated to the D range, the operation of the engine 22 is stopped when the power required by an entire vehicle as a sum of the required power of the ring gear shaft 32*a* as the drive shaft and the power required for charging and discharging the battery 50 is smaller than predetermined power determining a range in which the engine 22 is efficiently operated.

Next, an operation of this embodiment is described with reference to FIG. 1.

[Step S001]

First, the accelerator opening PAP and the vehicle speed (peller shaft rotation number) are read at a step S001.

[Step S002]

Figure 2:
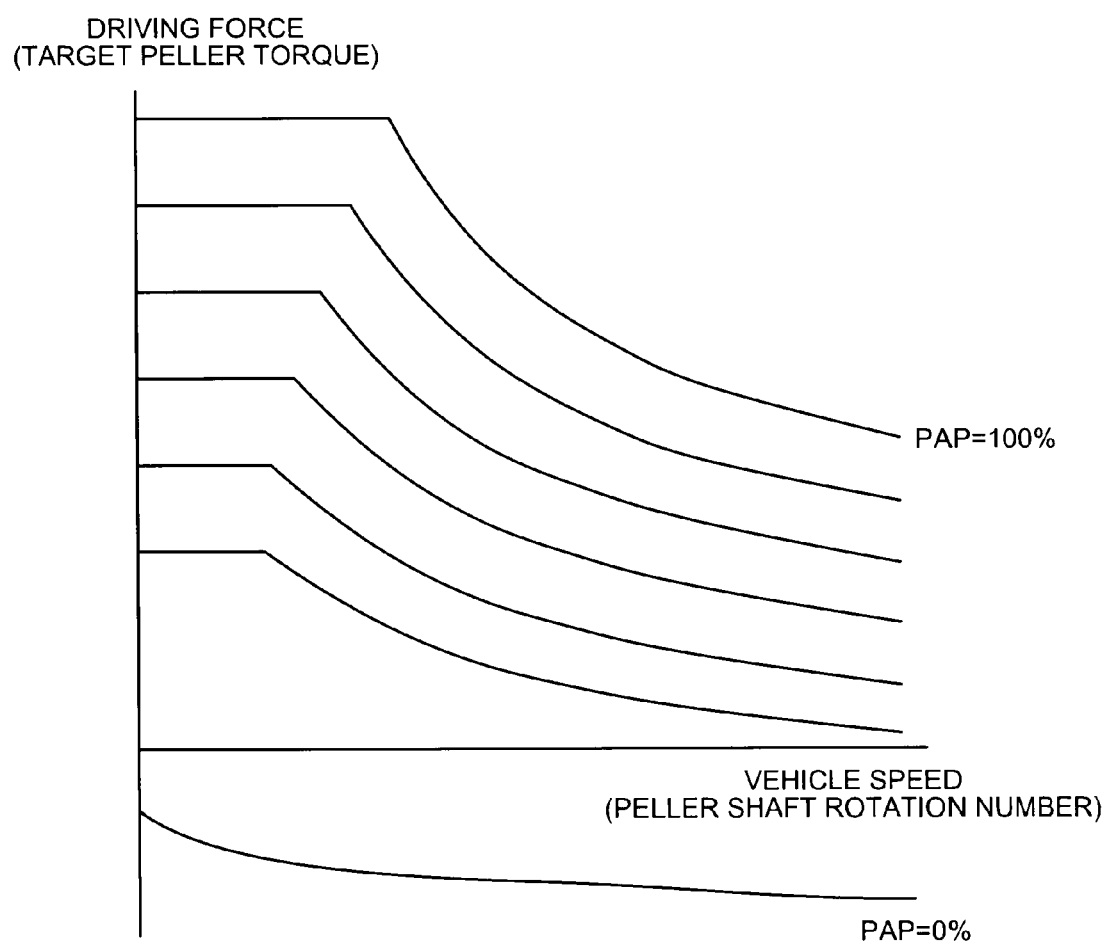
FIG. 2 is a map for calculating driver required peller shaft torque in the first embodiment of the braking/driving control device of the present invention.

Next, the peller shaft torque (drive shaft torque) required by the driver, that is to say, the driver required peller shaft torque (driver shaft torque) is calculated at a step S002. For example, a map as shown in FIG. 2 is referred to and the driver required peller shaft torque (driving force (target peller torque)) is calculated based on the accelerator opening PAP and the vehicle speed (peller shaft rotation number) read at the above-described step S001.

[Step S003]

Next, the power required by the driver (driver required power) and the engine rotation number required by the driver (driver required engine rotation number) are calculated at a step S003.

The driver required power is calculated based on the driver required peller shaft torque calculated at the above-described step S002 and the peller shaft rotation number read at the above-described step S001. Herein, (driver required power) =(driver required peller shaft torque)×(peller shaft rotation number).

Figure 3:
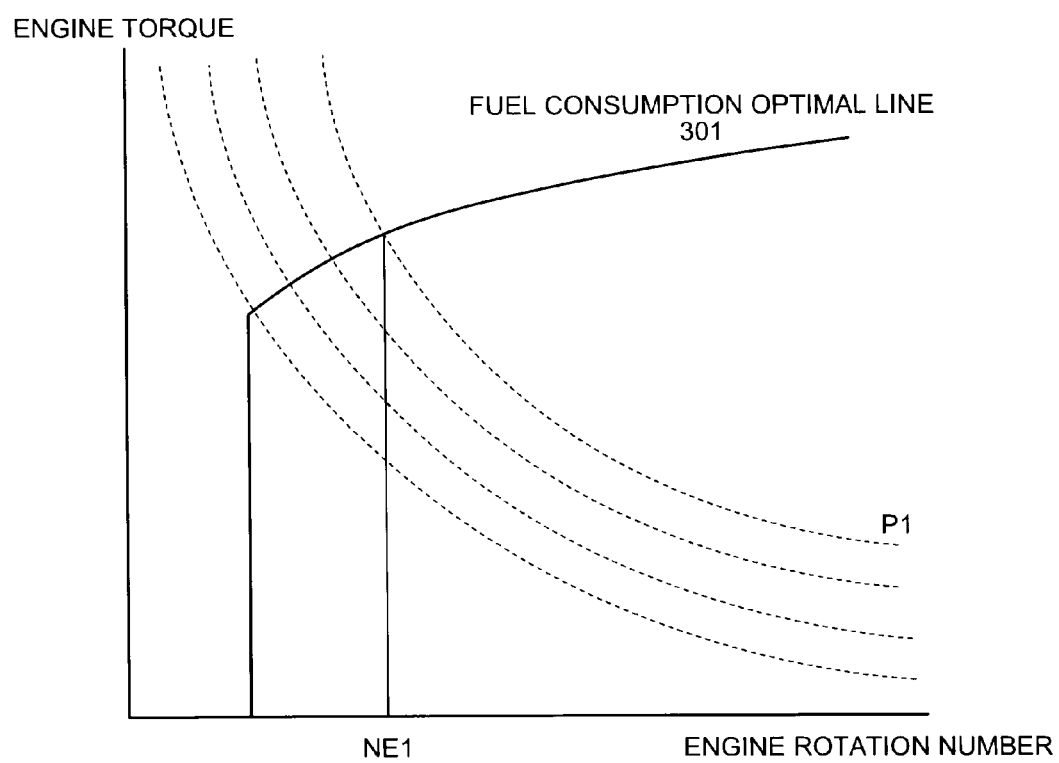
FIG. 3 is a map for calculating a driver required engine rotation number in the first embodiment of the braking/driving force control device of the present invention.

The driver required engine rotation number is calculated based on a fuel consumption optimal line 301, for example, by referring to the map as shown in FIG. 3. When the driver required power is P1, the driver required engine rotation number is NE1.

[Step S004]

Next, the target gear position required by the driver (driver required target gear position) is calculated at a step S004. For example, a map as shown in FIG. 4 is referred to, and the driver required target gear position is determined based on the accelerator opening PAP and the vehicle speed (peller shaft rotation number) read at the above-described step S001 and the driver required peller shaft torque calculated at the above-described step S002.

Figure 4:
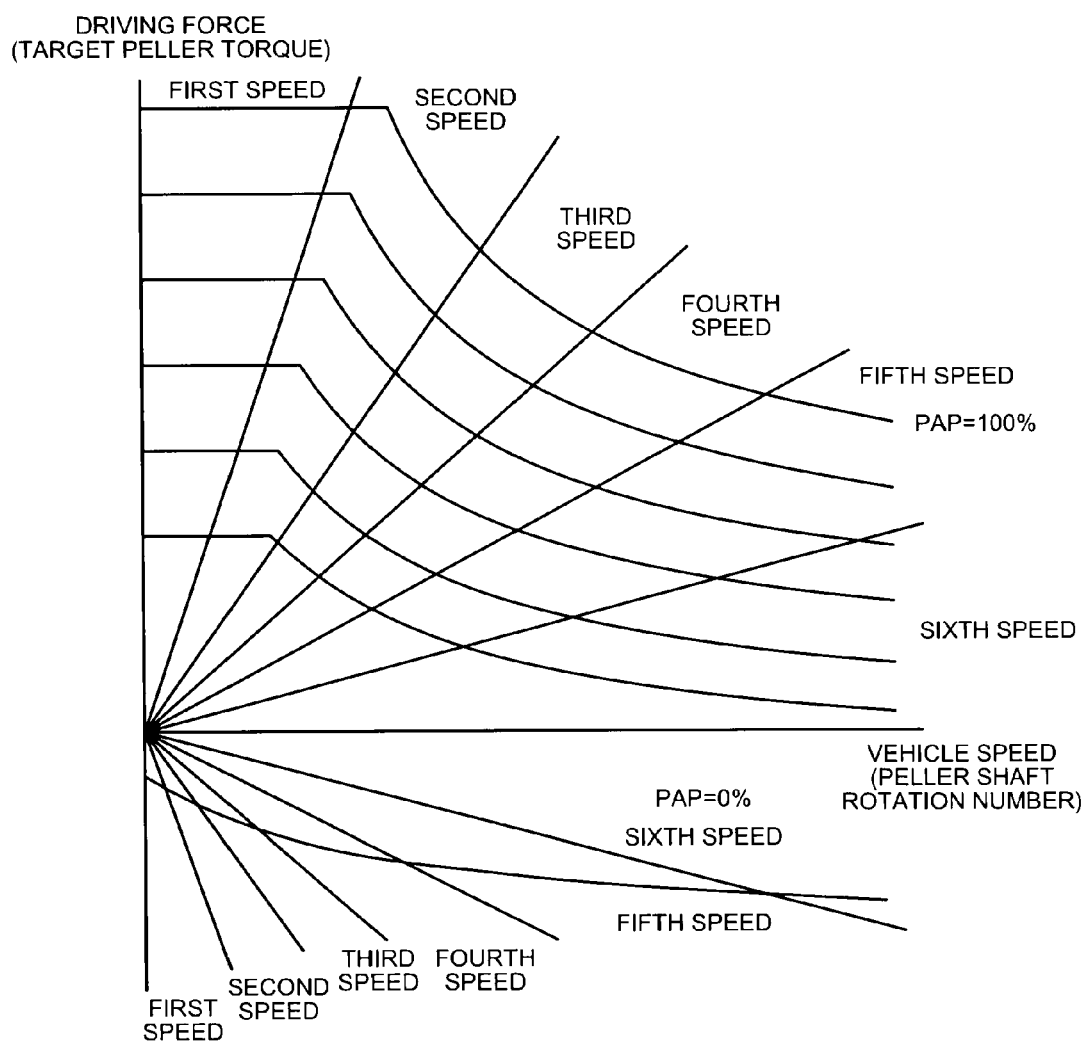
FIG. 4 is a map for calculating a driver required gear position in the first embodiment of the braking/driving force control device of the present invention.

At the step S004, a method of calculating the driver required target gear position is not limited to the above-described method using FIG. 4. For example, the gear ratio is calculated based on the driver required engine rotation number calculated at the above-described step S003 and the peller shaft rotation number read at the above-described step S001, a map in FIG. 8 is referred to, and the driver required target gear position can be determined based on the gear ratio.

Figure 5:
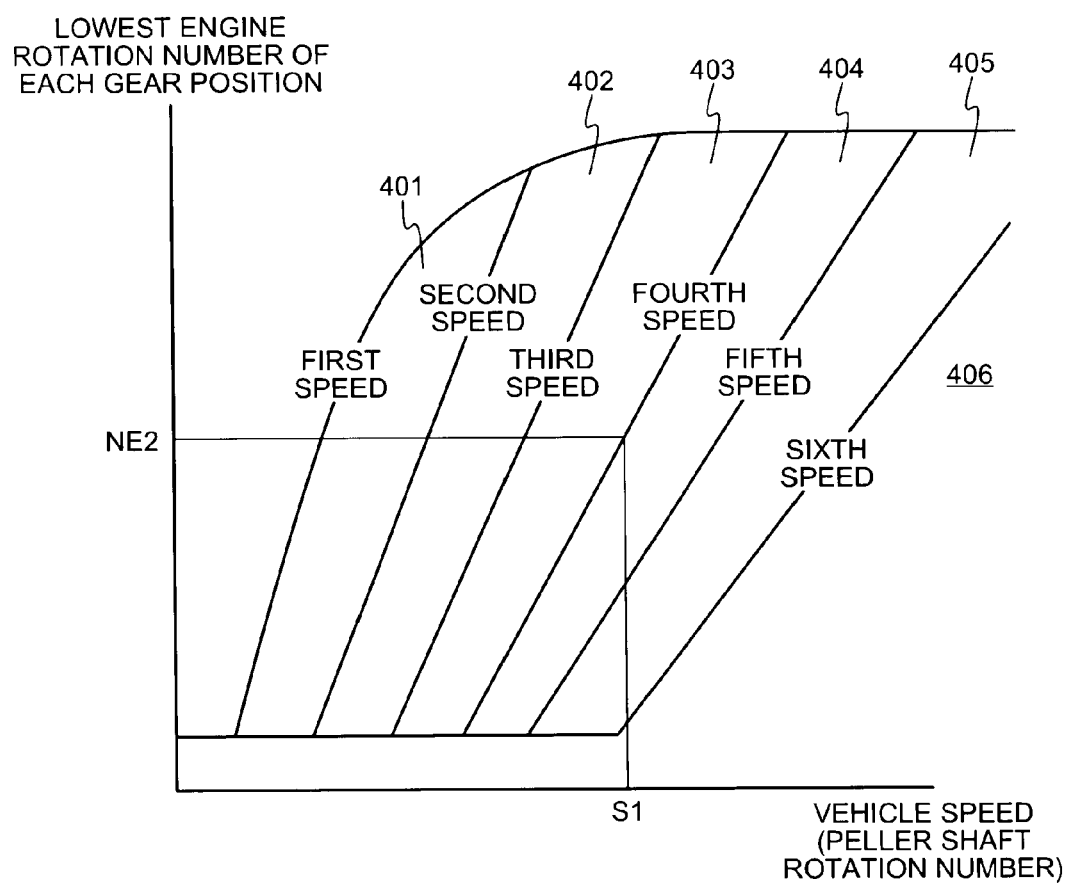
FIG. 5 is another map for calculating the driver required gear position in the first embodiment of the braking/driving force control device of the present invention.

Also, at the step S004, a method of using a map in FIG. 5 may be used in addition to the above-described method using FIGS. 4 and 8. FIG. 5 shows a lower limit engine rotation number of each gear position. The map in FIG. 5 is referred to, and the driver required target gear position can be determined based on the driver required engine rotation number calculated at the above-described step S003 and the vehicle speed (peller shaft rotation number) read at the above-described step S001. In FIG. 5, reference numerals 401, 402, 403, 404, 405 and 406 indicate ranges in which the driver required target gear position is a first speed, a second speed, a third speed, a fourth speed, a fifth speed, and a sixth speed, respectively.

[Step S005]

Figure 12:
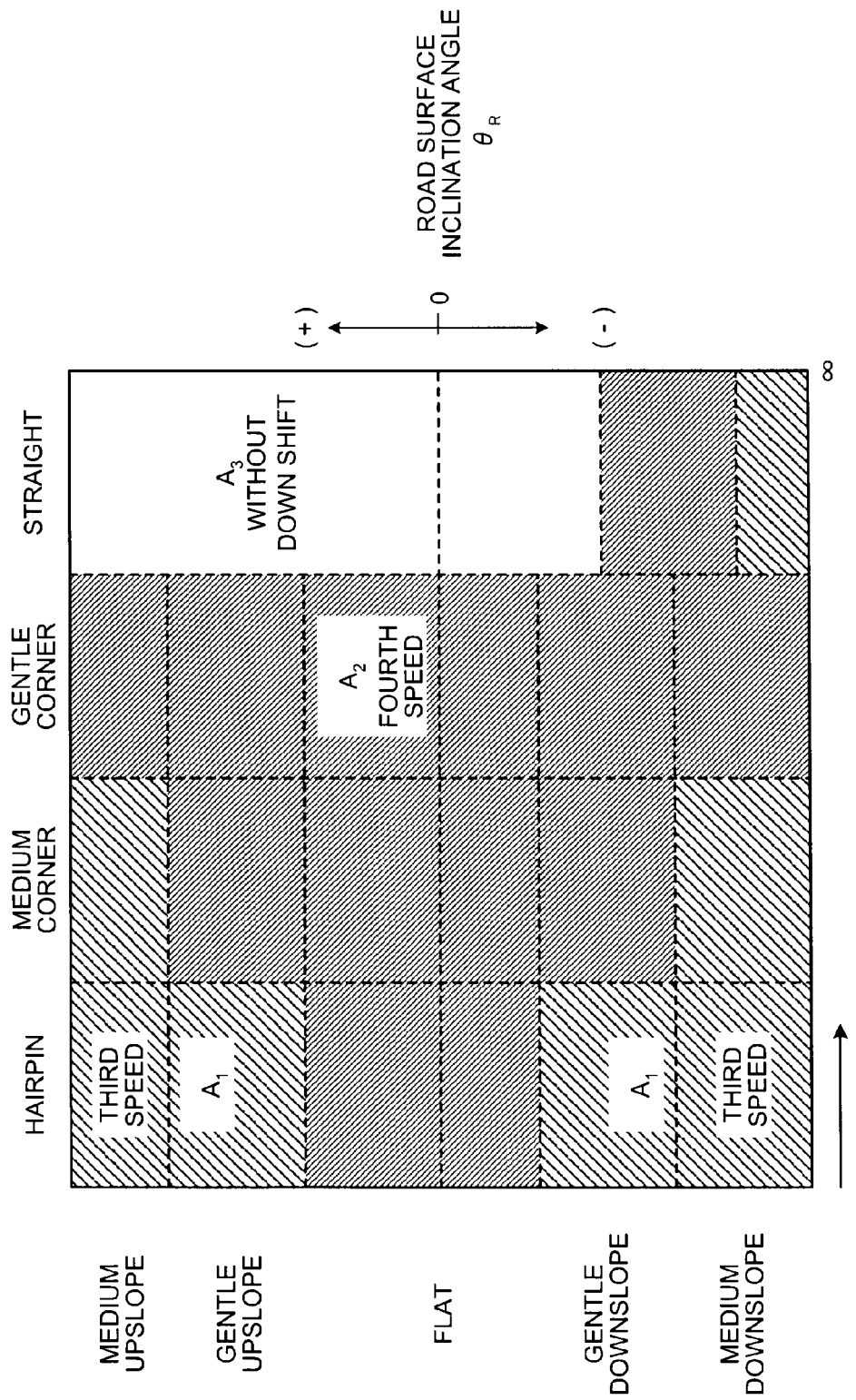
FIG. 12 is a map showing a target gear position according to a degree of curve at a corner in the first embodiment of the braking/driving force control device of the present invention.

Next, at a step S005, a regulation gear position of shift point control such as the upslope/downslope control, the corner control, and the inter-vehicle distance control is read. For example, when the upslope/downslope control is performed, a map as shown in FIG. 11 is referred to and the regulation gear position is determined. The target gear position corresponding to a road gradient θ is illustrated in FIG. 11, and the regulation gear position is the gear position higher than the target gear position by one position. Similarly, for example, when the corner control is performed, a map as shown in FIG. 12 is referred to and the regulation gear position is determined. When the inter-vehicle distance control is performed, a map shown in FIG. 13 is referred to and the regulation gear position is determined. FIGS. 12 and 13 show the target gear position, and the regulation gear position is the gear position higher than the target gear position by one position.

[Step S006]

Next, at a step S006, it is judged whether the driver required target gear position is not smaller than the regulation gear position of the shift point control obtained at the above-described step S005. When it is judged to be YES as a result of this judgment, the procedure shifts to a step S007, and if not, the procedure shifts to a step S008.

[Step S007]

At a step S007, the regulation gear position of the shift point control is reflected on the driver required target gear position and the regulation of the gear position is performed. At the step S007, driver required peller shaft torque (drive shaft torque) Tp* and a driver required engine rotation number Ne* are changed.

Figure 6:
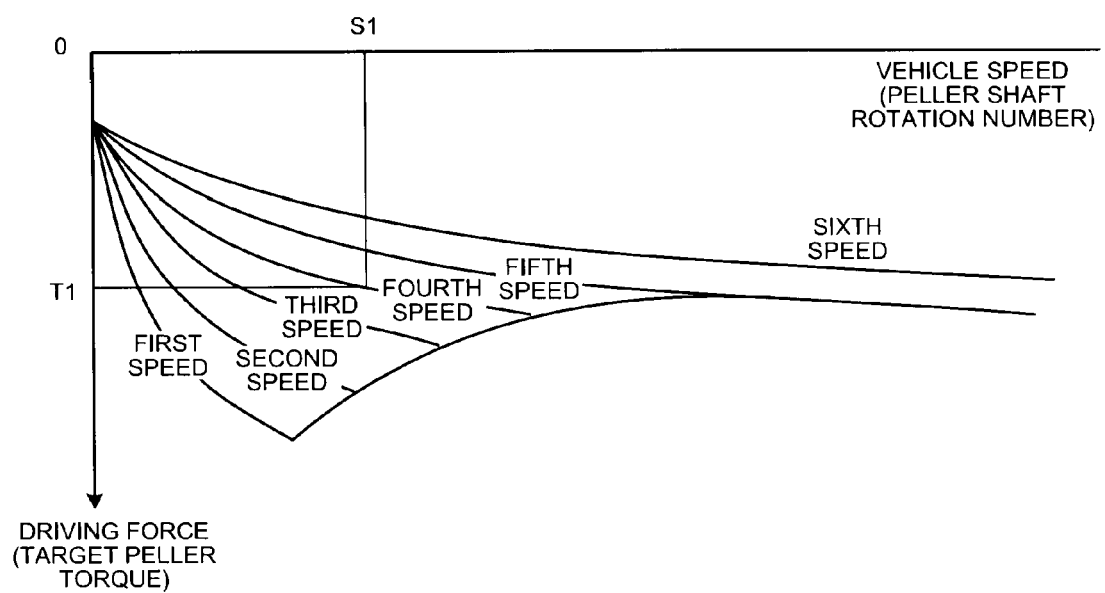
FIG. 6 is a view showing an example of target peller torque at the time of gear position regulation in the first embodiment of the braking/driving force control device of the present invention.
Figure 7:
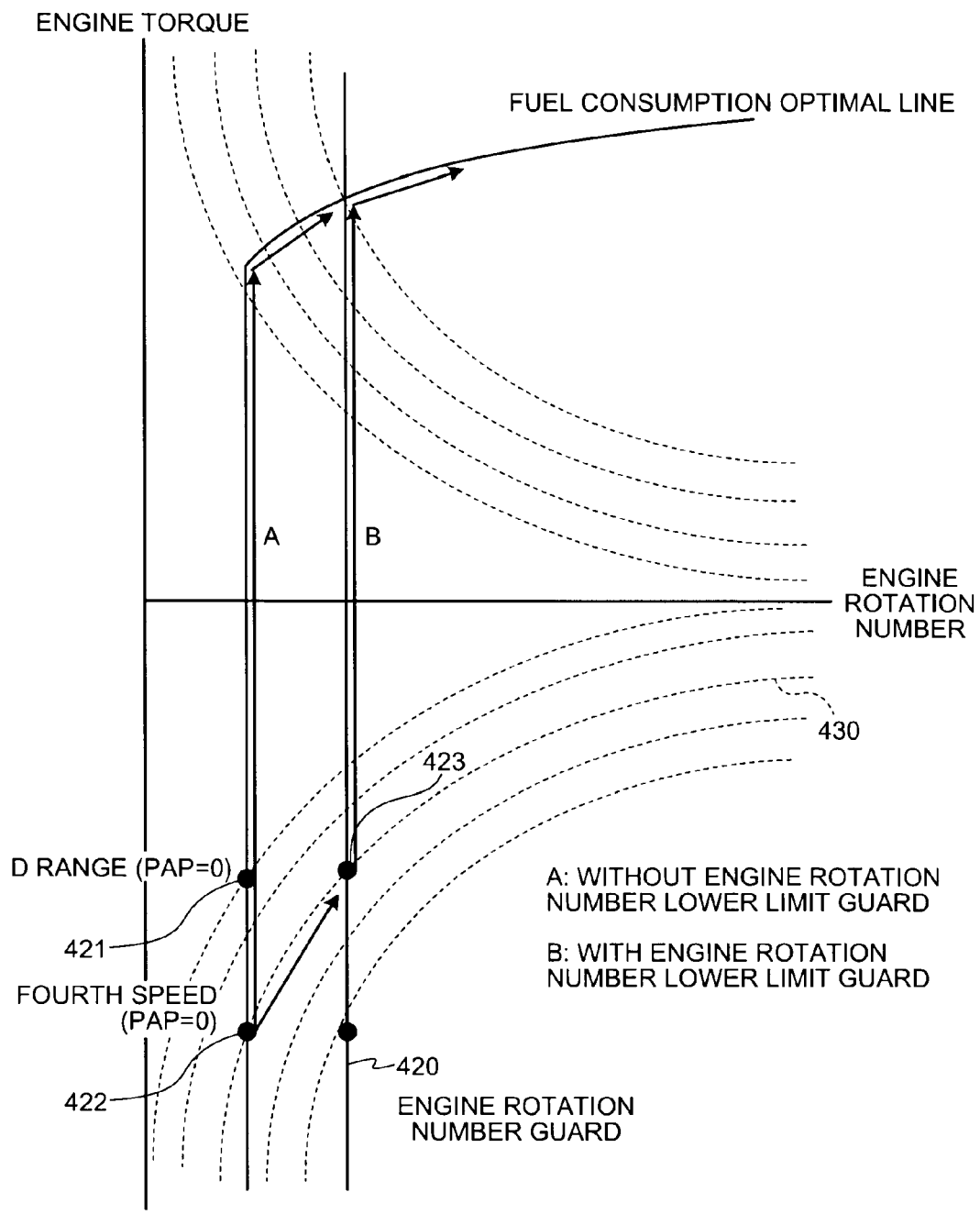
FIG. 7 is a view for illustrating an effect of the first embodiment of the braking/driving force control device of the present invention.

As shown in FIG. 6, the driver required peller shaft torque (drive shaft torque) Tp* is changed. That is to say, the map in FIG. 6 is referred to, and when the regulation gear position of the shift point control obtained at the above-described step S005 is the fourth speed and when the vehicle speed (peller shaft rotation number) is S1, for example, the driver required peller shaft torque Tp* is changed to T1.

Also, as shown in FIG. 5, the driver required engine rotation number Ne* is changed. For example, when the vehicle speed (peller shaft rotation number) is S1, a lower limit engine rotation number NeL* is changed to NE2.

[Step S008]

At a step S008, engine torque Te*, an MG1 rotation number Nm1*, target MG1 torque Tm1*, and target MG2 torque Tm2* are calculated. Hereinafter, a calculation method thereof is described in detail.

At the above-described step S007, the target rotation number Ne* of the engine 22, and the target peller shaft torque Tp* are set, and when Ne*≦NeL*, if Ne*=NeL*, Tp*×Np=Te*×Ne*, so that Te*=Tp*×Np/Ne* (Np is the peller shaft rotation number). Then, the target rotation number Nm1* of the motor MG1 is calculated by the following equation (1) using the set target rotation number Ne*, the rotation number Nr (=(conversion coefficient k)·(vehicle speed V)) of the ring gear shaft 32a, and a gear ratio ρ of the power distribution integration mechanism 30, and the torque command Tm1* of the motor MG1 is calculated by the following equation (2) based on the calculated target rotation number Nm1* and the current rotation number Nm1 of the motor MG1.

Figure 10:
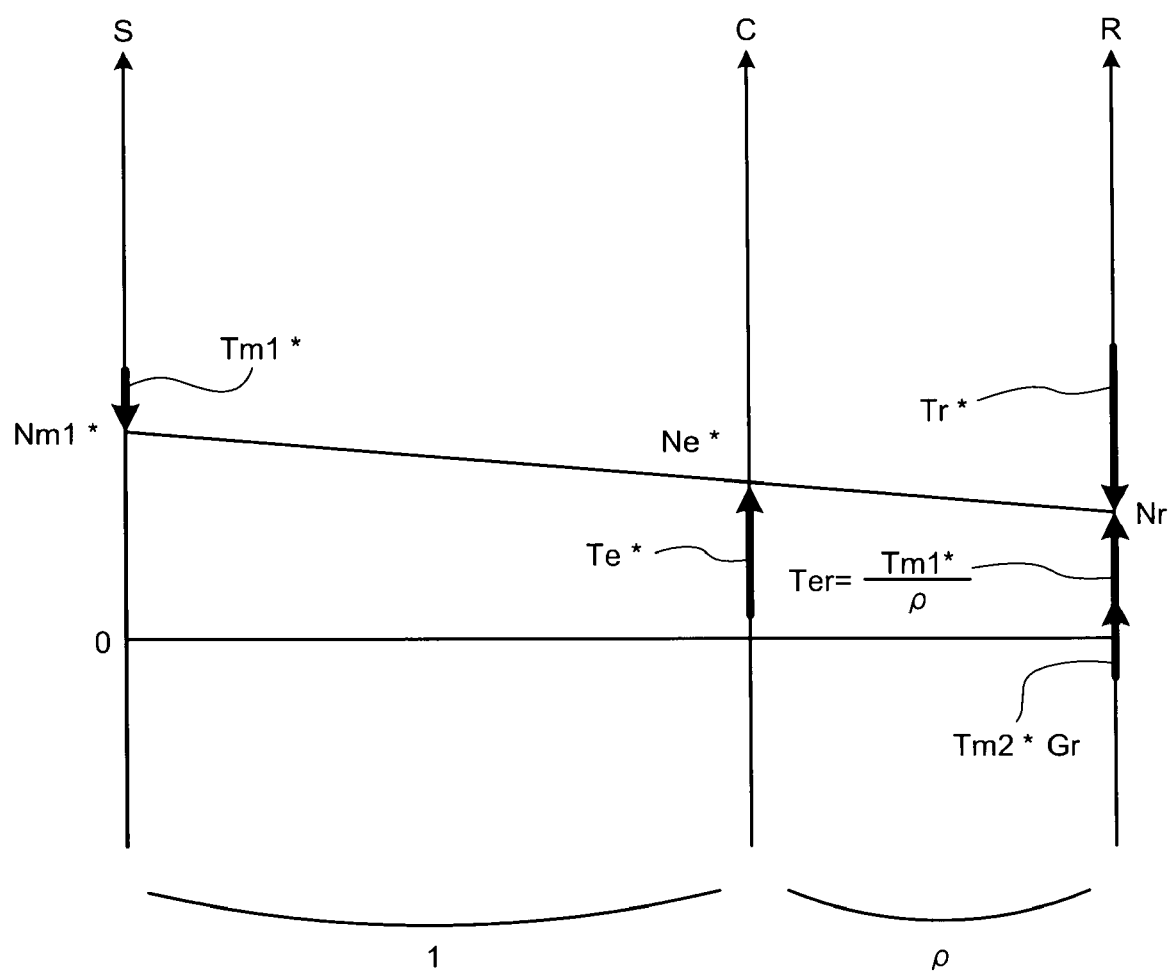
FIG. 10 is an alignment chart of a power distribution integration mechanism in the first embodiment of the braking/driving force control device of the present invention.

FIG. 10 shows an alignment chart showing mechanical relationship between the rotation number and the torque of each rotational element of the power distribution integration mechanism 30. In the drawing, an S axis on the left represents the rotation number of the sun gear 31, a C axis represents the rotation number of the carrier 34, and an R axis represents the rotation number Nr of the ring gear 32 (ring gear shaft 32a). The rotation number of the sun gear 31 is the rotation number Nm1 of the motor MG1 and the rotation number of the carrier 34 is a rotation number Ne of the engine 22, so that the target rotation number Nm1* of the motor MG1 can be calculated by the equation (1) based on the rotation number Nr (=k·V) of the ring gear shaft 32a, the target rotation number Ne* of the engine 22, and the gear ratio ρ of the power distribution integration mechanism 30.

Therefore, by controlling the drive of the motor MG1 by setting the torque command Tm1* such that the motor MG1 rotates at the target rotation number Nm1*, the engine 22 can be rotated at the target rotation number Ne*. Herein, the equation (2) is a relational expression in feed back control to allow the motor MG1 to rotate at the target rotation number Nm1*, and in the equation (2), "KP", which is the second term in a right side, is a gain of a proportional term, and "KI", which is the third term in the right side, is a gain of an integral term.

Meanwhile, two thick-line arrows on the R axis in FIG. 10 indicate the torque transmitted to the ring gear shaft 32a of the torque Te* output from the engine 22 at the time of stationary operation of the engine 22 at an operation point with the target rotation number Ne* and the target torque Te*, and the torque acting on the ring gear shaft 32a of the torque Tm2* output from the motor MG2.

$$Nm1^* = (Ne^* \cdot (1+\rho) - k \cdot V)/\rho \qquad (1)$$

$$Tm1^* = \text{previous } Tm1^* + KP(Nm1^* - Nm1) + KI\!\!\int(Nm1^* - Nm1)dt \qquad (2)$$

When calculating the target rotation number Nm1* of the motor MG1 and the torque command Tm1*, temporary motor torque Tm2tmp as the torque, which should be output from the motor MG2 to allow required torque Tr* to act on the ring gear shaft 32a, is calculated by the following equation (3) defined by proportional relationship of the torque in the alignment chart in FIG. 10, by using the required torque Tr*, the torque command Tm1*, the gear ratio ρ of the power distribution integration mechanism 30, and a gear ratio Gr of the reduction gear 35. Also, torque limitations Tm2min and Tm2max as the lower limit and upper limit of the torque, which may be output from the motor MG2, are calculated by the following equations (4) and (5) based on an input and output limitations Win and Wout of the battery 50, the torque command Tm1* of the motor MG1, the current rotation number Nm1 of the motor MG1, and the current rotation number Nm2 of the motor MG2, and smaller one of the temporary motor torque Tm2tmp and the calculated torque limitation Tm2max is set to a variable T, then larger one of the variable T and the torque limitation Tm2min is set as the torque command Tm2* of the motor MG2. Thereby, the toque command Tm2* of the motor MG2 can be set to the torque limited within a range of the input and output limitations Win and Wout of the battery 50.

$$Tm2tmp = (Tr^* + Tm1^*/\rho)/Gr \qquad (3)$$

$$Tm2min = (Win - Tm1^* \cdot Nm1)/Nm2 \qquad (4)$$

$$Tm2max = (Wout - Tm1^* \cdot Nm1)/Nm2 \qquad (5)$$

When the target rotation number Ne* and the target torque Te* of the engine 22 and the torque commands Tm1* and Tm2* of the motors MG1 and MG2 are set in this manner, the target rotation number Ne* and the target torque Te* of the engine 22 are transmitted to the engine ECU 24, the torque commands Tm1* and Tm2* of the motors MG1 and MG2, respectively, are transmitted to the motor ECU 40, and a drive control routine is terminated.

The engine ECU 24, which has received the target rotation number Ne* and the target torque Te* performs the control such as the fuel injection control and the ignition control in the engine 22 such that the engine 22 is operated at an operational point indicated by the target rotation number Ne* and the target torque Te*. Also, the motor ECU 40, which has received the torque commands Tm1* and Tm2*, performs switching control of switching elements of the inverters 41 and 42 such that the motor MG1 is driven by the torque command Tm1* and the motor MG2 is driven by the torque command Tm2*.

As described above, according to this embodiment, in a driving force control system (HV system) for determining the engine rotation number, the engine torque, the MG1 rotation number, the MG1 torque, the MG2 torque, and the like in order to realize the driver required peller shaft torque (drive shaft torque) or the driving force determined by the accelerator opening PAP and the vehicle speed (peller shaft rotation number), the driver required target gear position (target gear ratio, step S004) is determined from the target engine rotation number (step S003) determined by the driver required peller shaft torque (FIG. 2, step S002) and the peller shaft rotation number.

Also, the driver required target gear position is determined from the accelerator opening, the vehicle speed (peller shaft rotation number), and the driver required peller shaft torque (refer to FIG. 4). Alternatively, the gear ratio is calculated from the driver required engine rotation number and the peller shaft rotation number, and the driver required target gear position is determined from the gear ratio (refer to FIG. 8). The shift point control such as the upslope/downslope control, the corner control, and the inter-vehicle distance control are reflected on the target gear position (step S007).

Further, the peller shaft torque (drive shaft torque) or the driving force and the engine rotation number lower limit guard are provided for each target gear position (target gear ratio) (FIGS. 5 and 6), the gear position regulation (gear ratio regulation) of the shift point control such as the upslope/downslope control is reflected on the target gear position (target gear ratio), the target peller shaft torque and the target engine rotation number are changed (step S007), and the target engine torque, the target MG1 rotation number, the target MG1 torque, and the target MG2 torque are calculated (step S008).

According to this embodiment, the following effect can be obtained.

(1) The shift point control developed so as to be applied to the conventional general automatic transmission can be easily carried out in the hybrid system control device (a power train control device under driving force demand), and the drivability can be improved.

(2) When the accelerator is depressed at the time of reacceleration after performing the shift point control, this is the acceleration from a condition in which the engine rotation number is high, so that acceleration response is improved. Hereinafter, the effect (2) is described with reference to FIG. 7.

First, when the automatic transmission is in the D range, it is assumed that the target gear position of the shift point control is the fourth speed (step S004 in FIG. 1). Thereafter, the driver required peller shaft torque is changed to the target gear position (fourth speed) at the step S007. In this case, when there is not the lower limit engine rotation number (engine rotation number guard) 420, a point 421 in the D range changes to a point 422 in the fourth speed. At the time of reacceleration from the point 422 in the fourth speed, this is the acceleration from the low engine rotation number, so that the acceleration response is not excellent. The engine rotation number of the point 422 is similar to the engine rotation number of the point 421 and is about 1000 rpm, so that the acceleration response at the time of reacceleration is not excellent.

On the other hand, in this embodiment, there is the lower limit engine rotation number (engine rotation number guard) 420 (step S007), so that the first point 421 changes to a point 423 guarded by the lower limit engine rotation number 420 on an equivalent power line 430 of the point 422 by shift control. When the accelerator is depressed at the time of the reacceleration, this is the acceleration from the point 423 of which engine rotation number is higher than that of the above-described point 422, so that the acceleration response is improved.

INDUSTRIAL APPLICABILITY

As described above, the braking/driving force control device according to the present invention is applicable to the braking/driving force control device for changing the output torque by controlling the torque or the rotation number of the power source (including the engine or the motor generator), and is especially suitable for enabling to perform the driving regulation control due to the driving environment other than intentional shifting operation by the driver, for example, in the vehicle of the type without a transmission.

The invention claimed is:

1. A braking/driving force control device for controlling braking/driving force of a hybrid vehicle by changing an output torque by controlling torque of an internal-combustion engine, a rotation number of the internal-combustion engine, torque of an electric motor, and a rotation number of the electric motor, the device comprising:

a setting unit that sets a plurality of shift ranges by a plurality of parameters including an output rotation number;

a range judging unit that judges that a shift range corresponds to any of the plurality of shift ranges based on the parameters while driving; and a controlling unit that controls the torque of the internal-combustion engine, the rotation number of the internal-combustion engine, the torque of the electric motor, and the rotation number of the electric motor based on a driving environment and a range judgment result by the range judging unit.

2. The braking/driving force control device according to claim 1, wherein:

the controlling unit performs the control based on a preset driving force, and changes the preset driving force based on the shift range determined based on the driving environment, when the judged shift range is a shift range determined based on the driving environment or a shift range higher than the shift range determined based on the driving environment.

3. The braking/driving force control device according to claim 2, wherein:

a lower limit guard of the rotation number of the internal-combustion engine is set for each of the shift ranges, and the controlling unit performs the control based on a preset rotation number of the internal-combustion engine, and changes the preset rotation number of the internal-combustion engine to a rotation number of the internal-combustion engine not smaller than the lower limit guard based on the shift range determined based on the driving environment, when the judged shift range is the shift range determined based on the driving environment or the shift range higher than the shift range determined based on the driving environment.

4. The braking/driving force control device according to claim 1, wherein the plurality of shift ranges are set based on an output rotation number and an input rotation number.

5. The braking/driving force control device according to claim 1, wherein the plurality of shift ranges are set based on the output rotation number and an output torque.

6. The braking/driving force control device according to claim 2, wherein the plurality of shift ranges are set based on an output rotation number and an input rotation number.

7. The braking/driving force control device according to claim 2, wherein the plurality of shift ranges are set based on an output rotation number and the output torque.

8. The braking/driving force control device according to claim 3, wherein the plurality of shift ranges are set based on an output rotation number and an input rotation number.

9. The braking/driving force control device according to claim 3, wherein the plurality of shift ranges are set based on the output torque.

* * * * *